US006681344B1

(12) United States Patent
Andrew

(10) Patent No.: US 6,681,344 B1
(45) Date of Patent: Jan. 20, 2004

(54) SYSTEM AND METHOD FOR AUTOMATICALLY DIAGNOSING A COMPUTER PROBLEM

(75) Inventor: Felix GTi Andrew, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 546 days.

(21) Appl. No.: 09/662,397

(22) Filed: Sep. 14, 2000

(51) Int. Cl.[7] .............................................. G06F 11/00
(52) U.S. Cl. .......................................... 714/38; 714/26
(58) Field of Search .............................. 714/38, 43, 45, 714/46, 48, 25, 30, 31, 37, 18, 26; 706/45, 10, 101

(56) References Cited

U.S. PATENT DOCUMENTS

| 4,964,125 | A | * | 10/1990 | Kim ............................ 714/26 |
| 5,377,196 | A | * | 12/1994 | Godlew et al. ............. 714/712 |
| 5,633,800 | A | * | 5/1997 | Bankert et al. ............. 700/177 |
| 5,983,364 | A | * | 11/1999 | Bortcosh et al. ............. 714/25 |
| 6,115,489 | A | * | 9/2000 | Gupta et al. ................. 382/141 |
| 6,145,096 | A | * | 11/2000 | Bereiter et al. .............. 714/25 |
| 6,170,065 | B1 | * | 1/2001 | Kobata et al. ................. 714/7 |
| 6,249,755 | B1 | * | 6/2001 | Yemini et al. ............. 702/183 |
| 6,260,048 | B1 | * | 7/2001 | Carpenter et al. ....... 707/104.1 |
| 6,357,017 | B1 | * | 3/2002 | Bereiter et al. .............. 714/27 |
| 6,442,542 | B1 | * | 8/2002 | Ramani et al. ................. 707/3 |
| 6,501,849 | B1 | * | 12/2002 | Gupta et al. ................. 382/141 |
| 6,507,831 | B1 | * | 1/2003 | Varma et al. .................. 706/48 |

OTHER PUBLICATIONS

Melchiors, C., et al.; "Troubleshooting Network Faults Using Past Experience", NOMS 2000. 2000 IEEE/IFIP Network Operations and Management Symposium 'The Networked Planet: Management Beyond 2000', 2000, p. 549–562.

Along Lin, "A Model–Based Automated Diagnosis Algorithm", Methodology and Tools in Knowledge–Based Systems. 11th –International Conference on Industrial and Engineering Applications of Artificial Intelligence and Expert Systems. IEA–98–AIE. Proceedings. vol. 1, 1998, p. 848–856.

* cited by examiner

Primary Examiner—Nadeem Iqbal
(74) Attorney, Agent, or Firm—Amin & Turocy, LLP

(57) ABSTRACT

The present invention relates to an application for automatically diagnosing problems with an object via problem representation data that is substantially accurate, complete and language independent. The application may process the problem representation data via pattern matching problem representation data against known problems and may generate at least one of diagnostic information and solution information relating to the problem representation data. The present invention may also update a store of known problems and the diagnostic rules, diagnostic messages and solution messages associated with such known problems.

45 Claims, 12 Drawing Sheets

SYSTEM AND METHOD FOR AUTOMATICALLY DIAGNOSING A COMPUTER PROBLEM

TECHNICAL FIELD

The present invention relates generally to computer software and more particularly to diagnosing computer problems via pattern matching of problem representation data.

BACKGROUND OF THE INVENTION

As computers and computer applications have become more complicated, the opportunities for computer users to encounter difficulties with their computers have increased. When a user is confronted with a problem, the user may seek help resolving that problem. Conventionally, the user may turn to online help, friends and family, or phone based help. The person or entity trying to help the user (hereinafter the "diagnoser") may desire to interact with both the user and the computer with the problem. Some problems may be reported without the user initiating such a report. For example, a phone may be purchased that initially has no phone number. Upon activation, the phone may automatically generate a request for help.

Diagnosing problems has historically been difficult because the diagnoser often has incomplete and/or inaccurate data available from which to make a diagnosis. Further complicating the difficulty of diagnosis are time and language barriers. Data may be incomplete or inaccurate because users interact with computers via a user interface that may contain several screens and require numerous choices to be made. Conventionally, user interfaces may include an output component for displaying information in the user's language and an input component for acquiring information. Incomplete data is provided, when, for example, from a sequence of information displayed to the user, the user recalls less than all the information displayed and less than all the choices made concerning the information. Inaccurate data is thus provided when, for example, a user indicates one action was taken when in fact a different action was taken.

When a user seeks help via the telephone, for example, the user may describe their problem, including what user interfaces they traversed and what choices they made. The user may not be able to accurately, completely or timely describe the user interface information needed by the diagnoser, however. For example, the user may only recall 7 of 10 screens traversed and may incorrectly recall which boxes on these screens were checked. These phone conversations can be lengthy and may be hampered by language barriers and time constraints, such as a French-speaking user calling an English-speaking support person at eight p.m. local time, which is four a.m. at the support center One attempt to solve the problems of inaccurate, incomplete and untimely data is to transmit a bitmap of the user's screen to the diagnoser. While this produces more accurate information concerning the user interface currently in the user's view, it does nothing to address the problems of identifying which paths through the user interface the user has taken, which options the user had available at each user interface screen and what choices the user made concerning those options. Furthermore, transmitting a bitmap of a French screen to an English-speaking support person at 4 a.m. does nothing to alleviate the language and time barriers. Thus, someone who speaks the language of the user still has to be available at the time the user has the problem.

Yet another attempt to solve the problems of inaccurate, incomplete and untimely data is to enable the diagnoser to remotely access the computer with the problem. For example, the diagnoser may access the problem computer via the Internet. While this produces more accurate information concerning the user interface currently in the user's view, it still does not improve the path, option and choice incompleteness problems, nor does it address the language and time problems described above.

Yet another attempt to solve the problems of inaccurate, incomplete and untimely data is to provide help either on the user's computer or via an on-line help server. This attempted solution requires the user to have their problem information available and to self-diagnose the problem. Although this provides more timely opportunities for diagnosis, it does not address the path, option and choice incompleteness problems described above. Furthermore, it leaves the diagnosis in the hands of the relatively unskilled.

Thus, diagnosing computer problems remains a time consuming, human intensive, time and language constrained problem. Consequently there is a need for a method and system for diagnosing problems via complete, substantially accurate and language independent data.

SUMMARY OF THE INVENTION

The present invention relates to automating the diagnosis of computer problems. Automatic diagnosis is facilitated by the availability of problem representation data that is substantially complete, accurate and language independent. The problem representation data may be generated in accordance with a well-formed, rigorous schema enabling automatic processing via pattern matching, for example. More particularly the present invention relates to automated Extensible Style Language (XSL) pattern matching of well-formed Extensible Markup Language (XML) documents that capture user interface information from a computer with a problem. Pattern matching enabled by XSL patterns provide a query language for identifying nodes in an XML document, based on their type, name, and values, as well a the relationship of the node to other nodes in the document. Such pattern matching processing facilitates automatic processing and solves the time, language and language problems associated with conventional systems as described above.

One aspect of the present invention may include a generating component that produces problem representation data associated with user interface information from the computer with the problem. Providing user interface information via problem representation data that is created in accordance with a rigorous schema facilitates automating diagnosis since substantially complete, accurate and language independent data, suitable for pattern matching, is generated. Pattern matching like that available via XML and XSL processing simplifies diagnosis because it provides a general purpose query notation for addressing and filtering the elements and text of XML documents. Using a consistent rigorous schema also makes pattern-matching rules easier to write and maintain and facilitates automated processing of problem representation data from more than one type of device and for more than one type of problem.

User interface dialogs and the paths taken through a series of user interface dialogs may be captured by a document written in a computer language like XML. By representing a user interface in a document conforming to a problem data space schema and by storing the paths taken through the user interface, the options available to the user, the choices made by the user and the values produced or states created by a user in response to the user interface, rather than by storing the text of the user interface or a bitmap of the current user interface dialog, the problems of incomplete and inaccurate data are solved. Furthermore, by storing structure and values rather than text, the language in which the user interacted with the computer with the problem is removed from the diagnostic analysis. The substantially complete, accurate, language independent data enables automated diagnosis. By enabling automated diagnosis, the problems associated with 4 a.m. calls from foreign language users are mitigated since the automatic diagnoser may work in a language independent manner and may be insensitive to time of day.

Another aspect of the present invention includes a diagnostic and solution application. The diagnostic and solution application may automatically process the problem representation data by accessing a diagnosis and solution database and by pattern matching, for example. By applying diagnostic rules to the patterns, if any, that are matched, the diagnostic and solution application may produce diagnostic and solution information that may be returned to the computer with the problem.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
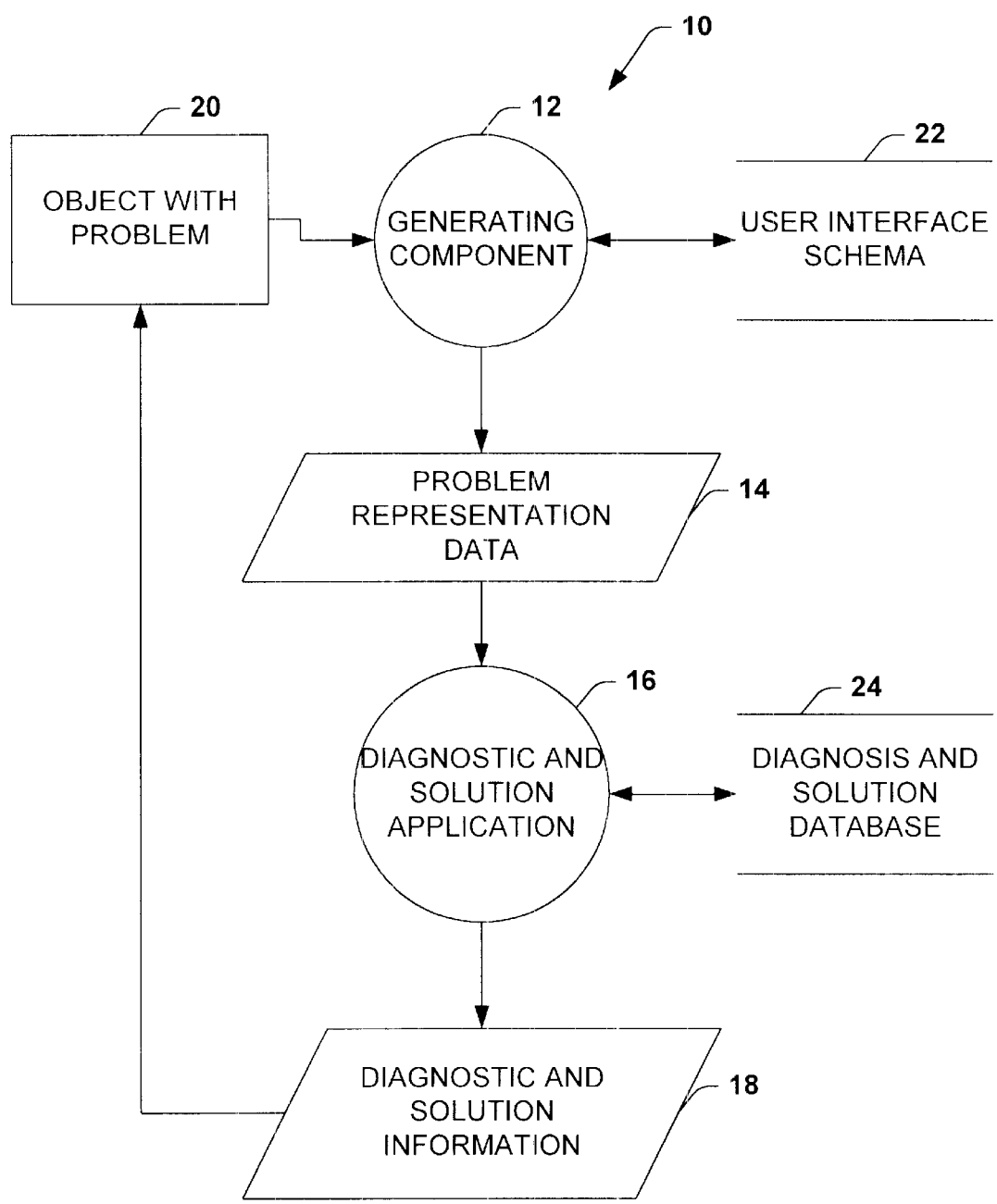
FIG. 1 is a schematic block diagram illustrating a system for automatically diagnosing an object with a problem in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to facilitate description of the present invention.

FIG. 1 is a flow diagram illustrating a system 10 for diagnosing problems in accordance with an aspect of the present invention. The system 10 may include a generating component 12 for producing problem representation data 14 that will be input into a diagnostic and solution application 16 that produces diagnostic and solution information 18 associated with the problem represented in the problem representation data 14.

The application 16 accepts problem representation data 14 associated with an object with a problem 20 in order to look for patterns in the problem representation data 14 and to produce diagnoses and solutions to the problem represented in the problem representation data 14. The problem representation data 14 is generated by the generating component 12, which formats the problem representation data 14 in accordance with a user interface schema 22 so that automatic processing via pattern matching may be accomplished. The application 16 examines the problem representation data 14 to determine whether a pattern in the problem representation data 14 matches known problems stored in a diagnosis and solution database 24. If data matching the problem representation data 14 is found in the diagnosis and solution database 24, then diagnostic and solution information 18 may be returned to the object with the problem 20 so that the problem may be identified and corrected.

By way of illustration, a user may desire to configure a computer's hard disk with a number of partitions. The user may invoke a hard disk partitioning utility to perform the partitioning. The hard disk partitioning utility may have a multi-level user interface, with numerous possible paths through the interface. After traversing the user interface and making certain choices in response to the options presented by the user interface, the disk partitioning may not have been carried out successfully. At this point, the user has a, problem and the user's computer may become an instance of the object with a problem 20. In accordance with an aspect of the present invention, the user may then invoke the generating component 12, which would examine the user interface the user traversed, and in conjunction with the user interface schema 22 generate the problem representation data 14 associated with the user's problem. The problem representation data 14 may be input into the diagnostic and solution application 16, which examines the problem representation data 14 to determine if the problem stored therein matched any problem stored in the diagnosis and solution database 24. If the user's problem representation data 14 matched a pattern in the diagnosis and solution database 24, then diagnostic and solution information 18 may be generated by the diagnostic and solution application 16 and returned to the object with the problem 20.

For example, in traversing the user interface for disk partitioning, the user may have neglected to select what type of hard drive is in the computer, and thus the partitioning utility may not complete successfully. This may be a common problem, and one that is matched by examining the user interface structure and values generated when the user traversed the user interface. If the "select hard drive type" user interface dialog was traversed but no value was chosen, a certain pattern may be created in the problem representation data 14, wherein a pattern may be matched to a pattern in the diagnosis and solution database 24.

Figure 2:
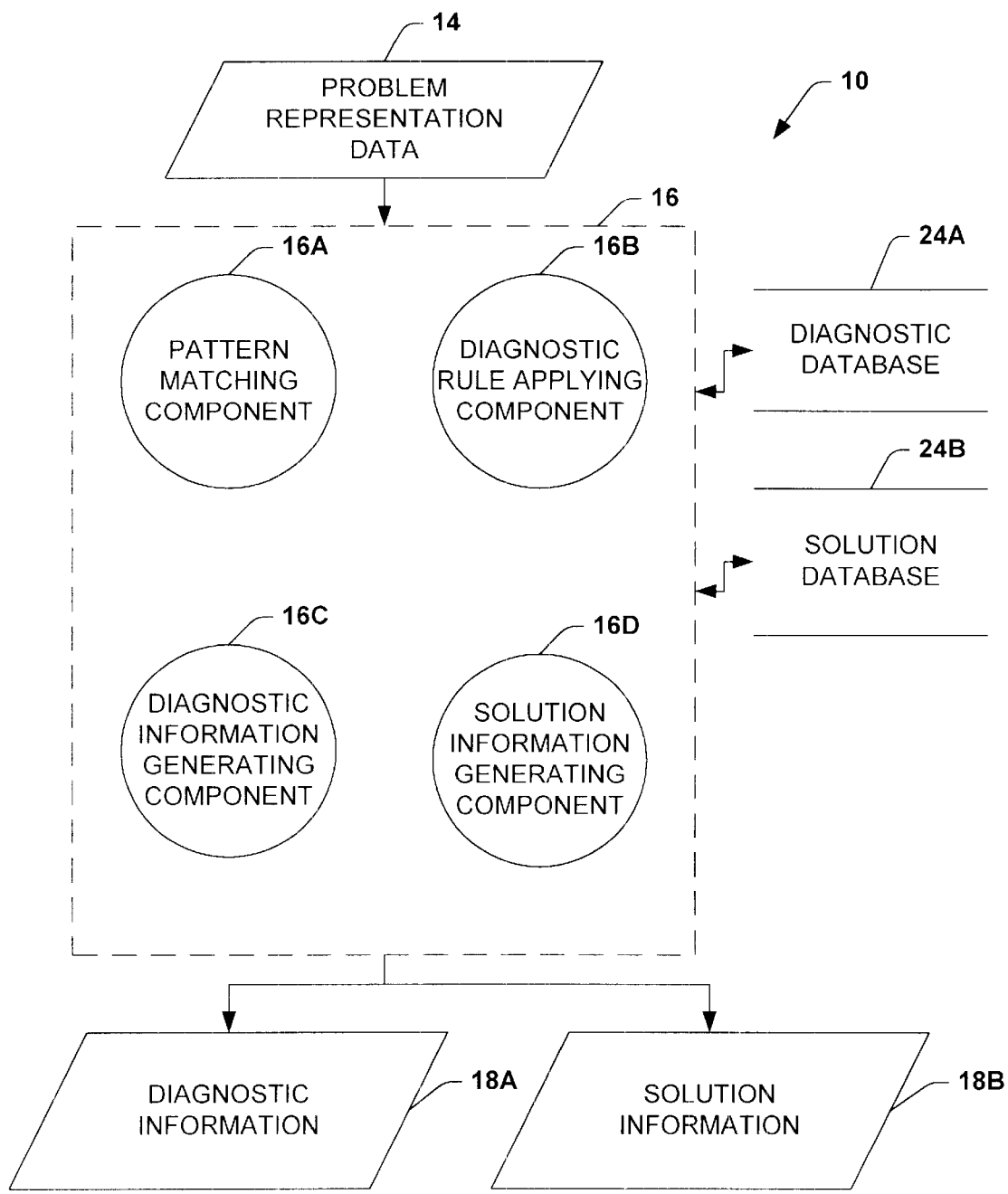
FIG. 2 is a schematic block diagram illustrating an example aspect of the system for automatically diagnosing an object with a problem in accordance with an aspect of the present invention.

Turning now to FIG. 2, an exemplary aspect of the diagnostic and solution application 16 of the system 10 is illustrated. The application 16 may further include a pattern matching component 16A that will compare the patterns stored in the problem representation data 14 with patterns stored in the diagnostic database 24A. If a pattern stored in the problem representation data 14 is found in the diagnostic database 24A, then the pattern-matching component may invoke the diagnostic rule applying component 16B that will apply one or more diagnostic rules to the patterns that were matched to determine whether a diagnosis may be made from the matching patterns. If such a diagnosis is determined, then the diagnostic rule applying component 16B may invoke the diagnostic information generating component 16C to generate diagnostic information 18A. If no such diagnosis is made, then the problem may be escalated to some other application, entity or diagnoser.

The application 16 may further include a diagnostic information generating component 16C that produces and forwards diagnostic information 18A to the object with the problem 20. The diagnostic information 18A may take the form of an email message, a configuration file, and/or an XML document, for example. The application 16 may further include a solution information generating component 16D that determines whether a solution is available to the diagnosed problem in the solution database 24B. If a solution is available, then the solution information generating component 16D generates and forwards the solution information 18B to the object with the problem 20. The solution information 18B may take the form of an email message, a configuration file, an XML document and/or an executable process that may make the desired physical changes on the computer with the problem 20. In some cases, verifiably trustworthy solution information 18B may be automatically applied by the computer with the problem 20. While for purposes of illustration, email messages, configuration files, XML documents and executable processes are identified above in association with the diagnostic information 18A and the solution information 18B, it is to be appreciated by one skilled in the art that the diagnostic information 18A and the solution information 18B may take other forms and are not limited to those identified above.

The diagnosis and solution database 24 may further include a diagnostic database 24A that may include known patterns to be matched against the problem representation data 14 and diagnostic rules to be applied if a match is found. Further, the diagnostic database 24A may also include diagnostic information messages that may be transmitted back to the object with the problem 20 to inform the user of what problem or problems have been diagnosed.

The diagnosis and solution database 24 may further include a solution database 24B that may include solution information messages, solution executables, and/or solution configuration files that may be transmitted back to the object with the problem 20 to remedy the problem or problems that were diagnosed.

The diagnostic and solution application 16 may update the diagnostic database 24A and the solution database 24B to enable the application 16 to be self-adapting. If a pattern for which no match is found in the diagnostic database 24A is presented frequently to the diagnostic and solution application 16, for example one hundred times in a week, then the diagnostic and solution application 16 may insert the pattern into the diagnostic database 24A so that it may be matched in the future. After such insertion, the diagnostic rule applying component 16B and the solution database 24B may also be updated by another application, entity or diagnoser to reflect a desired diagnosis and solution for the newly inserted pattern so that the system 10 may be self-adapting.

By way of illustration, as described above, a user may desire to configure a hard disk drive with a number of partitions. The user may encounter a problem that leads to the user generating problem representation data 14 associated with the hard disk drive configuration. For example, the user interface dialogs visited and the values set when each dialog was visited during the hard disk drive configuration process may be stored. The problem representation data 14 may be input into the diagnostic and solution application 16, in more particular to the pattern matching component 16A. The pattern matching component 16A examines the problem representation data 14, comparing it to patterns stored in the diagnostic database 24A. If a matching pattern is found, for example, if the problem representation data 14 indicated that a certain dialog had been visited but no value had been chosen during the visit, and the diagnostic rule applying component 16B applied a rule requiring that a value be chosen for the dialog, then the diagnostic rule applying component 16B may determine whether a diagnosis may be made from the fact that a pattern match was made and no value was chosen. Not all matched patterns may have diagnoses. Because the system 10 is self-adapting, some patterns may be matched for which there is no diagnosis yet. Similarly, some diagnoses may be made for which there is no solution. After determining that a diagnosis can be made from the combination of the matched pattern and the applied diagnostic rule, the diagnostic rule applying component 16B may invoke the diagnostic information generating component 16C to inform the object with the problem 20 of the diagnosis. The solution information generating component 16D may then examine the solution database 24B to determine whether a solution is available for the diagnosed problem. For example, a solution to the problem described above may be to send an executable process to the object with the problem 20 that will examine the hard disk drive to determine its type and automatically make the choice that the user did not make when traversing the user interface. Alternatively, the solution information generating component 16D may send an email message to the object with the problem explaining steps to be taken to remedy the problem associated with the computer with the problem 20. While for purposes of illustration email messages and executable processes are described above in association with the diagnostic information 18A and the solution information 18B, it is to be appreciated by one skilled in the art that the diagnostic information 18A and solution information 18B may take other forms and are not limited to those described above.

If no pattern was matched by the pattern matching component 16A, but the pattern matching component determined that the pattern found in the problem representation data 14 had been presented frequently to the pattern matching component 16A, for example one hundred times in one week, then the pattern matching component 16A may insert the pattern into the diagnostic database 24A. Thus the system 10 may be self-adapting. Utilized in conjunction with the process illustrated in FIG. 7E, the system 10 may thus improve diagnosis.

The pattern matching component 16A may then inform a separate application, entity or diagnoser that a new pattern had been entered into the diagnostic database 24A and that desired diagnostic rules, diagnostic information and solution information may be desired. Thus the diagnostic and solution application 16, the diagnostic database 24A and the solution database 24B may learn from the problem representation data 14 presented. This may be beneficial, for example, when an upgrade is made to a computer application or to an operating system. A plurality of users may all encounter a similar problem, of which the diagnostic and solution application 16 was not previously aware. If a certain number of users generate problem representation data 14 and forward it to the diagnostic and solution application 16 then the diagnostic database 24A may be updated, diagnosers may become aware of the problem, and its solution, and the solution database 24B may be updated. Thus, problem diagnosis may be improved.

Figure 3:
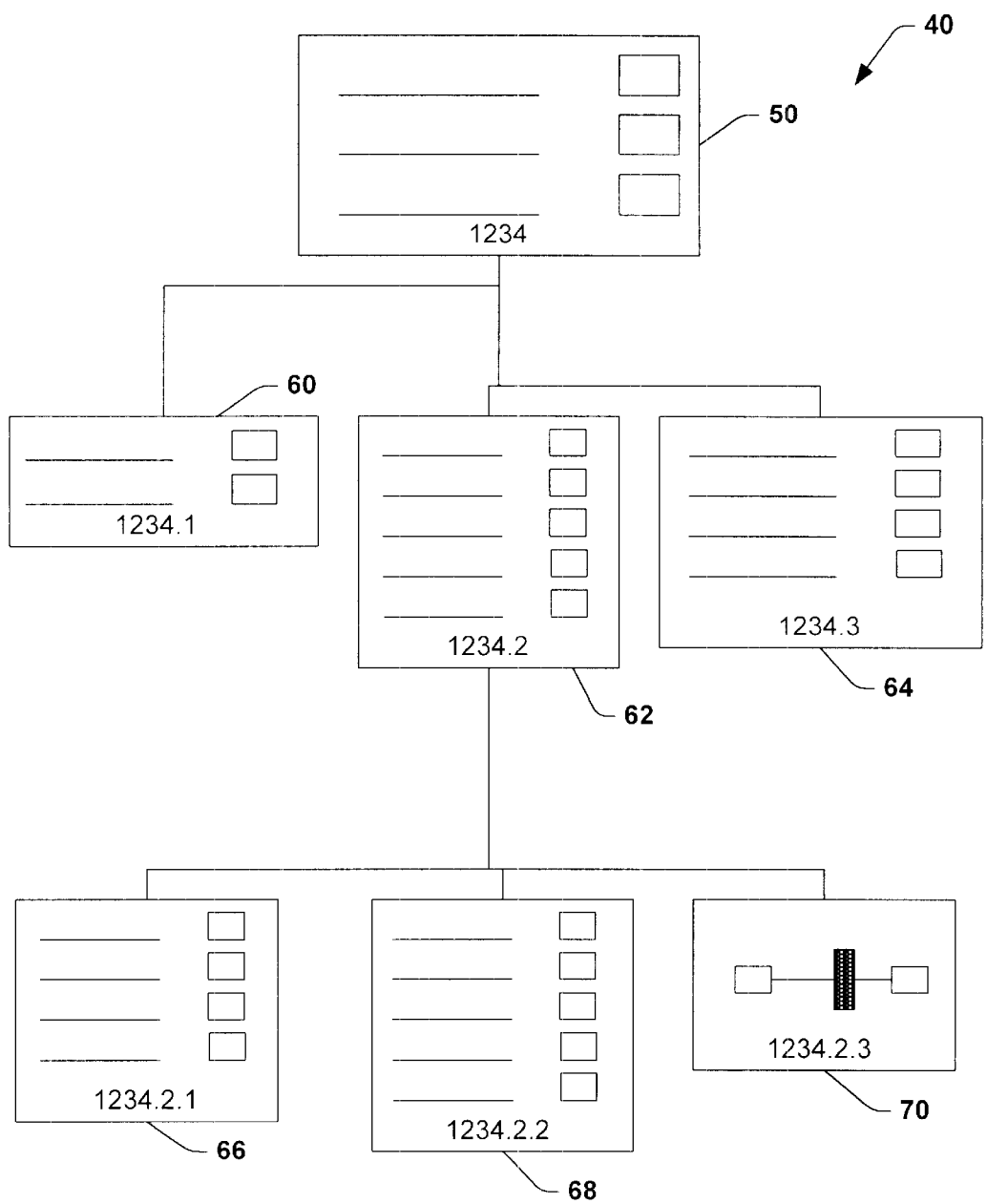
FIG. 3 is a tree diagram illustrating a user interface represented in a hierarchical structure in accordance with an aspect of the present invention.

Turning now to FIG. 3 an example of a user interface 40 that may be traversed in performing an action and that may be represented in problem representation data 14 by a document conforming to a schema is illustrated. A first user interface dialog 50 is represented as having three check boxes. The dialog 50 represents a dialog a computer user may see first when attempting to perform some action. For example, a user attempting to configure the number of partitions on their hard disk drive may be presented with dialog 50, which may ask the user how many partitions they want; one, two or three. The user interface dialog 50 includes a unique control identification number that will be utilized in generating the problem representation data 14 (FIG. 1). Based on the user's choices concerning the check boxes on dialog 50, the user may then be presented with any, all, or none of the dialogs 60, 62, and 64. If, for example, the user chose one partition, and their hard drive already had one partition, then dialog 60 may be presented. Dialog 60 contains 2 check boxes that may inform the user that one partition already exists and presents the two options of quitting or trying a different number. If, for example, the user had chosen one partition, and there were already two partitions on their hard drive, then the user may have been presented with dialog 62 which contains 5 check boxes, each of which may represent choices concerning an option and which may itself lead to subsequent dialogs. For example, the five choices illustrated may deal with which of the two partitions on the hard drive the user wants to eliminate, and other choices involved in eliminating a hard drive partition. Dialog 64 contains four boxes, each of which may be involved in hard drive partition configuring. Similarly, dialogs 66, 68 and 70 all represent dialogs that may be involved in configuring hard disk drive partitions. For example, dialog 70 may be used to set the percentage of the hard drive to be allocated to a new partition.

The dialogs in the user interface 40 may have a unique control identification number. For example, dialog 50 has a control identification number 1234. Similarly dialog 62 has a control identification number 1234.2 and dialog 70 has a control identification number 1234.2.3. The user interface schema 22 takes advantage of the unique control identification numbers assigned to user interface dialogs in representing the problem data space by constructing hierarchies, for example graph based data structures, with nodes that may be organized according to the unique control identification numbers. Similarly, the diagnostic and solution application 16 uses the unique control identification numbers and values assigned in response to the dialogs associated with unique control identification numbers when pattern matching by, for example, looking for certain sets of control identification number and value pairs. Certain sets of control identification number and value pairs may represent patterns that the XSL processor identifies. Examples of unique control identification number, value pairs are described in more detail below.

The structure of the user interface 40 illustrated in FIG. 3 would be identical no matter what language choices or localizations were in effect for the text of the dialogs. Similarly, the unique control identification numbers would be identical no matter what language is displayed on the face of the control. Since the user interface 40 may be described in a tree structure as illustrated in FIG. 3, the user interface 40 may be represented by information stored in a document conforming to a schema written in a computer language like XML, for example. Further, as a user traverses portions of the user interface 40, which portions were visited and the values set in response to each dialog may also be represented by information stored in an XML document. Since an XML document can be used to record the state and history of the user interface 40, pattern-matching languages like XSL can be used to automatically examine the XML document. The XSL pattern matching will be based on substantially complete, accurate and timely information recorded in the XML document thus solving problems encountered in the prior art. The diagnoser has available not just the present state of the computer and the current settings of the user interface, but also all the choices that were available to the user and how the user traversed the user interface to create the current state. Because this information is stored in a document conforming to a schema and is written in a language like XML, the state can be regarded as a pattern for which XSL can search and a trigger for which XSL can offer a response, for example. This reduces the reliance on human interactions and thus resolves the time and language barrier problems.

While for purposes of illustration 6 dialogs in a three level hierarchy are illustrated in FIG. 3, it is to be appreciated by one skilled in the art that a greater or lesser number of dialogs and/or levels may be implemented in accordance with the present invention.

Figure 4:
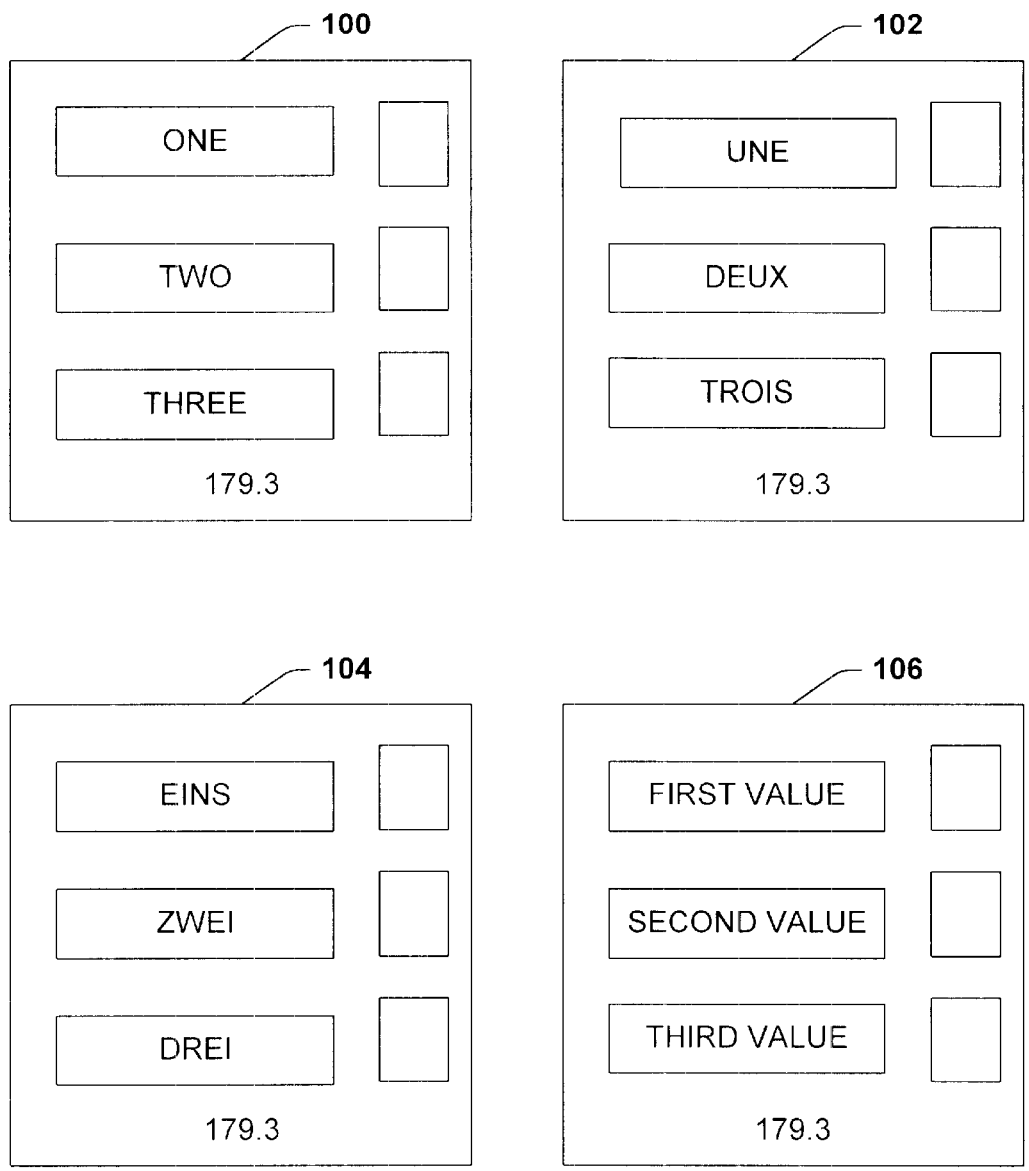
FIG. 4 is a schematic block diagram illustrating language dependent and language independent user interface dialogs.

Turning now to FIG. 4, four dialogs 100, 102, 104 and 106 are illustrated. Dialog 100 presents an English language interface, dialog 102 presents a French language interface and dialog 104 presents a German language interface. Each interface may be utilized to query the user concerning how many partitions are desired on the hard disk drive. Regardless of the language on the interface, the three check boxes represent the decision to be made between a first value, a second value and a third value. If, for example, the user interface is being presented to determine how many partitions to create on a hard disk drive, the application behind the user interface may be passed one of three binary numbers, 0001, 0010 or 0011 based on which box is checked. The text displayed in English, French or German beside the check box is not processed by the application. Similarly, the language beside the check boxes is not processed by the diagnoser. The diagnoser benefits from knowing which box was checked, not what was written in the dialog.

The document storing the user interface in accordance with an aspect of the invention would store the unique control identification number, the structure of the generic dialog 106 and the value generated in response to the localized implementation of the dialog. The language in which the generic dialog 106 was presented is irrelevant to the application 10.

Figure 5:
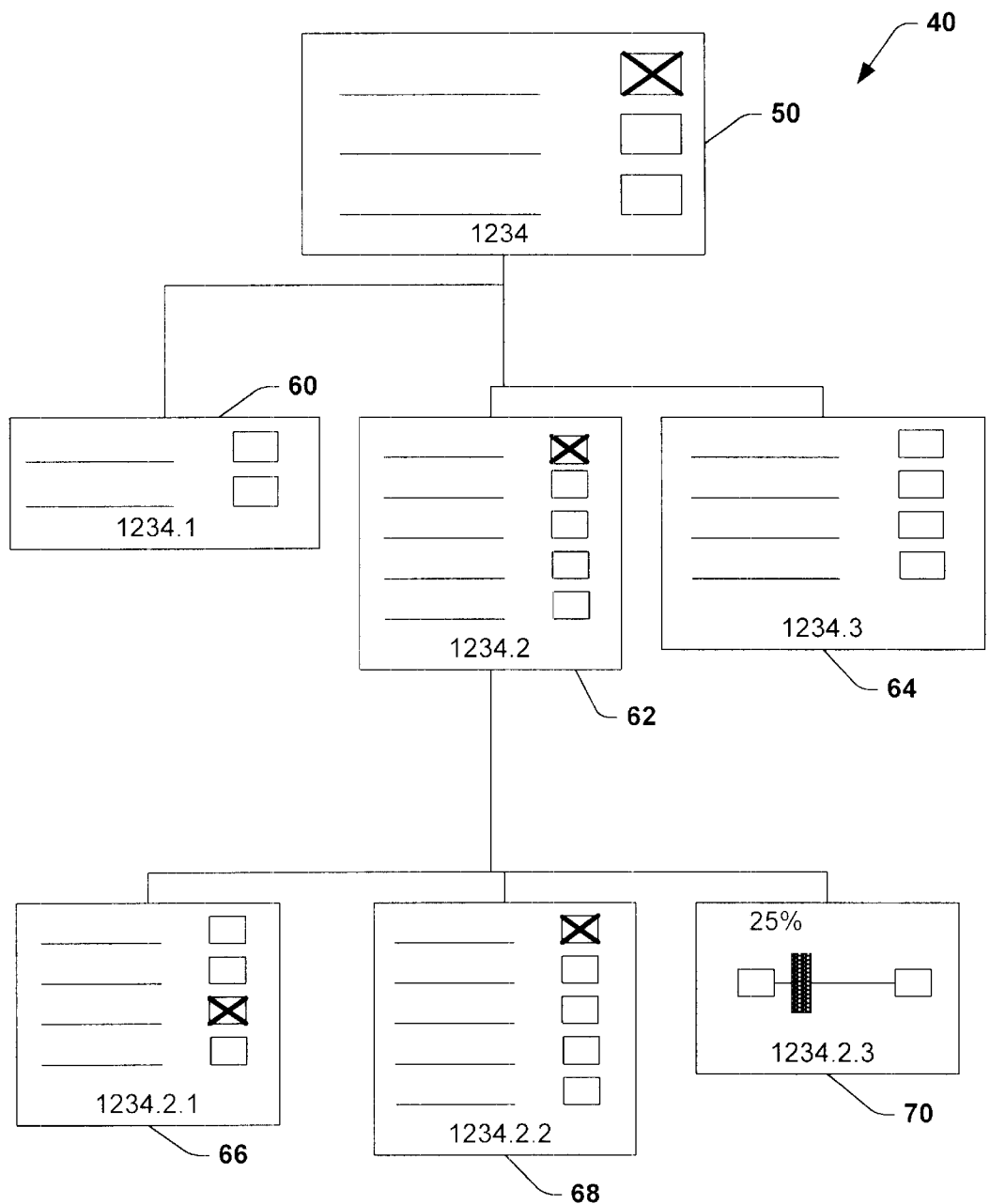
FIG. 5 is a tree diagram illustrating a user interface after it has been traversed by a user in accordance with an aspect of the present invention.

Turning now to FIG. 5, an example of the user interface 40 of FIG. 3 illustrates choices made by a user visiting various dialogs in the user interface 40. For example, the user may have checked the first box on dialog 50, the first box on dialog 62, the third box on dialog 66, the first box on dialog 68 and may have slid the slider on dialog 70 to the left indicating a desired value of 25%. These choices may have been made by the user when deciding how many partitions to install on a hard drive. After traversing the user interface and having made these choices, the user may realize that the desired result has not been achieved. The user now has a problem that may be represented by problem representation data 14 in accordance with an aspect of the present invention.

In addition to the overall structure of the user interface for an application being stored in the user interface schema 22, the dialogs visited and the value set at each dialog in a user interface may be stored. For example, in traversing the user interface 40 in FIG. 5, and making the illustrated choices, the following dialog number, value number pairs may be generated:

1234:1
1234.1:null
1234.2:1
1234.2.1:3
1234.2.2:1
1234.2.3.25

This list shows the order in which the user interface was traversed and what values, if any, were set at the dialogs as they were visited. For example, dialog 1234 was visited first and check box 1 was set, then dialog 1234.1 was visited and no value was set. Dialog 1234.2.3 was visited last and a value of 25% was set. If the hard disk partition configuration is not operating in a desired fashion after such hard disk partitioning choices are made, then the user may invoke the problem data representation data generating component 12 to create and send problem representation data 14, for example, an XML document storing the overall user interface structure and the list of dialog number, value pairs created when the user interface was traversed. The diagnostic and solution application 16 may accept the problem representation data 14 in the form of an XML document, for example, and attempt to match patterns in the problem representation data 14 via XSL processing well known to those skilled in the art. The diagnostic and solution application 16 may, if a match is found, transmit a diagnosis of what is wrong via diagnostic information 18A. Such diagnostic information may be, for example, an email notice that box two on control 1234.2.2 is not checked and should be checked and that box one on control 1234.2.2 is checked and should not be checked. The diagnostic and solution application 16 may then transmit a solution to the problem via solution information 18B. For example, a small executable process may be transmitted to make the desired physical changes. It is to be appreciated by one skilled in the art that although emailing a text message and transmitting a small executable are discussed above, different solutions may be generated in accordance with the present invention.

In the example described above, the user invoked the generating component 12 to generate the problem representation data 14 but then the subsequent processing was automated. The subsequent automated processing was performed on substantially complete, accurate, language independent data that may be processed regardless of time and language barriers, thus solving the problems in the prior art.

Figure 6:
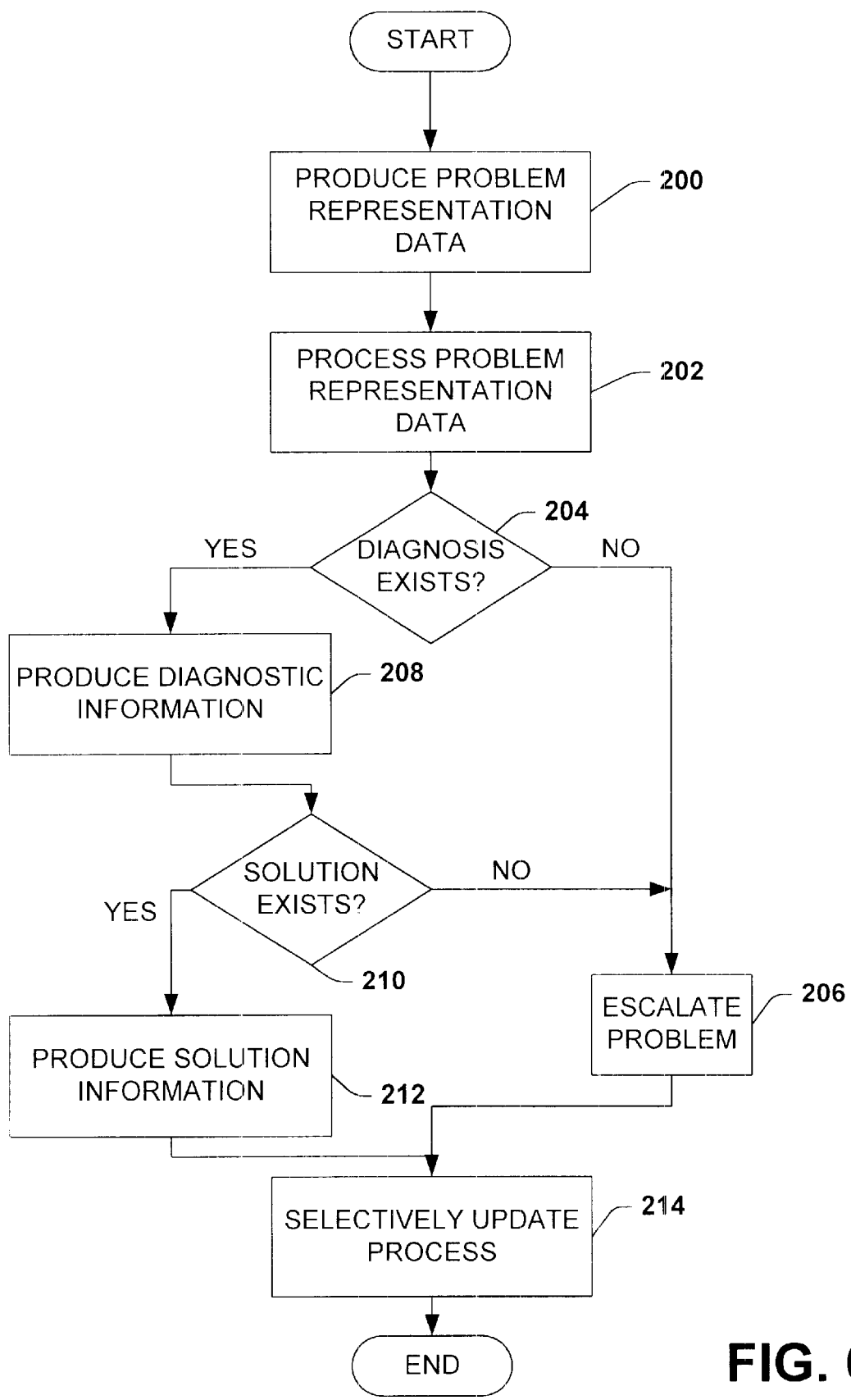
FIG. 6 is a flow chart illustrating a methodology for automatically diagnosing problems with an object in accordance with an aspect of the present invention.

Turning now to FIG. 6 a methodology for automatically diagnosing problems with an object in accordance with an aspect of the present invention is illustrated. At step 200, problem representation data may be produced. For example, if a user tried to configure hard disk drive partitions and did not achieve the desired result, then the user may invoke an aspect of the present invention to generate problem representation data associated with the user interface traversed in attempting to configure the hard disk drive partitions. At step 202, the problem representation data produced at step 200 may be processed. For example, the problem representation data may be compared to known problems and diagnostic rules may be applied to the problem representation data if it matches a known problem. At step 204 a determination may be made whether a diagnosis exists for the problem representation data generated at step 200. If no such diagnosis exists, then at step 206 the problem may be escalated to a different application, entity or diagnoser for further processing. If a diagnosis does exist then at step 208 diagnostic information may be produced. For example, an email may be sent describing the problem.

At step 210 a determination will be made whether a solution exists for the problem associated with the problem representation data processed at step 202. If no such solution exists, then at step 206 the problem may be escalated to a different application, entity or diagnoser for further processing. If a solution does exist then at step 214, solution information may be produced. For example, an executable process may be sent to make physical changes to create the desired result. At step 214, one or more data stores used by processes of steps 202, 208 and 212 may be selectively updated based on, for example, the frequency of occurrence of certain patterns in problem representation data. The functional blocks illustrated at steps 200, 202, 208, 212 and 214 may be broken down into sub steps, as illustrated in FIGS. 7A through 7E.

Figure 7A:
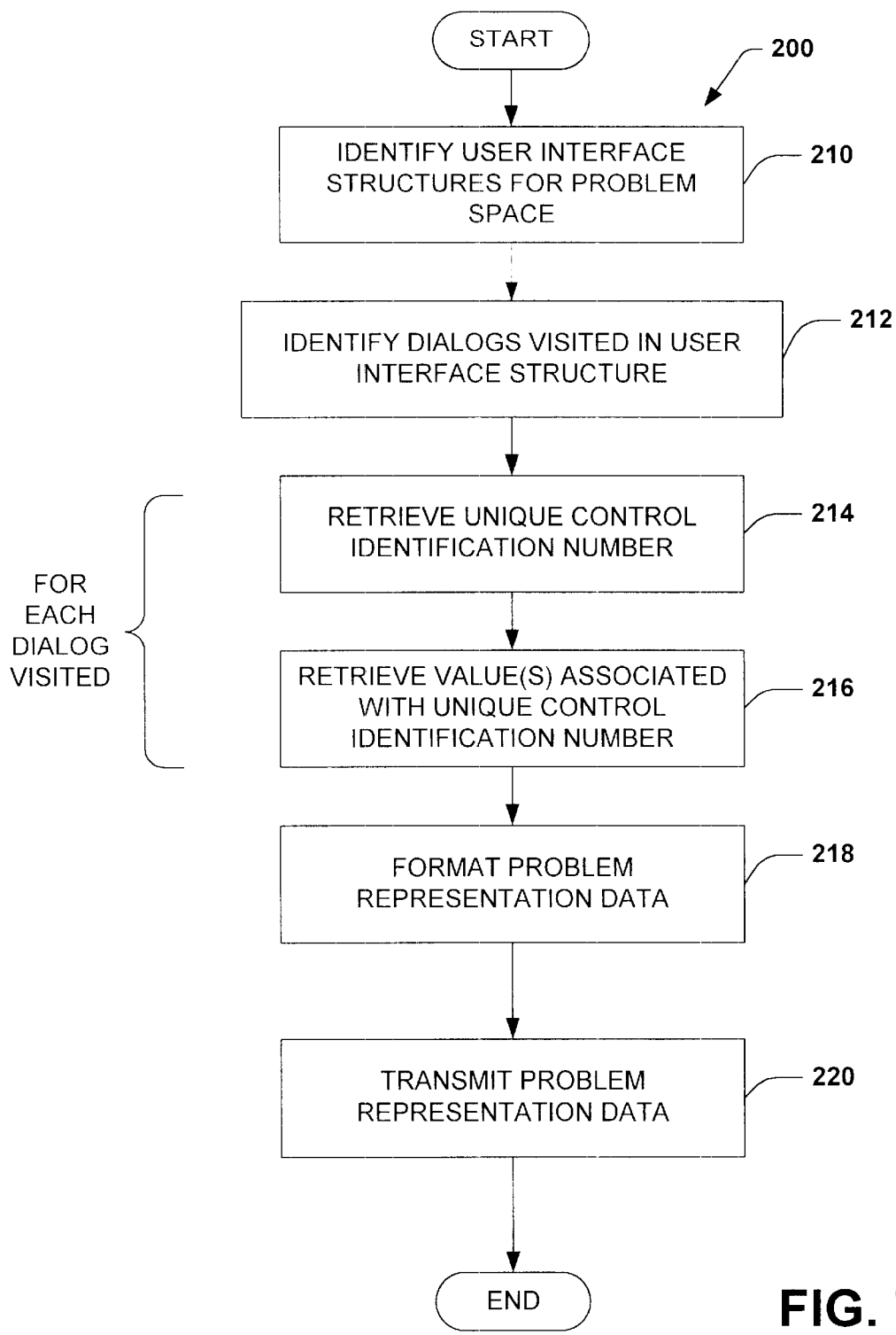
FIG. 7A is a flow chart further illustrating a methodology for producing problem representation data in accordance with an aspect of the present invention.

Turning now to FIG. 7A, step 200 of FIG. 6 is broken down into sub steps. At step 210 the user interface structures associated with the problem may be identified. For example, if a user partitioned a hard disk drive, then the user interface structure or structures associated with disk partitioning would be retrieved. At step 212, from the dialogs available in the user interface structures retrieved at step 210, the dialogs that were visited by the user in partitioning the hard drive would be identified. At step 214, the unique control identification number for each dialog visited would be retrieved by, for example, comparing the dialogs visited, as retrieved in step 212 with the user interface structure as retrieved at step 210. At step 216, the values set, if any, associated with the unique control identification number retrieved at step 214 are retrieved. From the unique control identification number retrieved at step 214 and the values set as retrieved at step 216, pairs of unique control identification numbers and values may be generated. The pairs of unique control identification numbers and values may, at step 218, be formatted, along with the user interface structure, into problem representation data. By way of illustration, the pairs of unique control identification numbers and values may be written into a well-formed XML document. In addition to the user interface presented to the user, other information may also be placed in the XML document. For example, hardware information and software settings that may assist in diagnosing a problem and in finding trends in problems may also be placed in the XML document. At step 220 the problem representation data may be transmitted to the process illustrated in FIG. 7B.

Figure 7B:
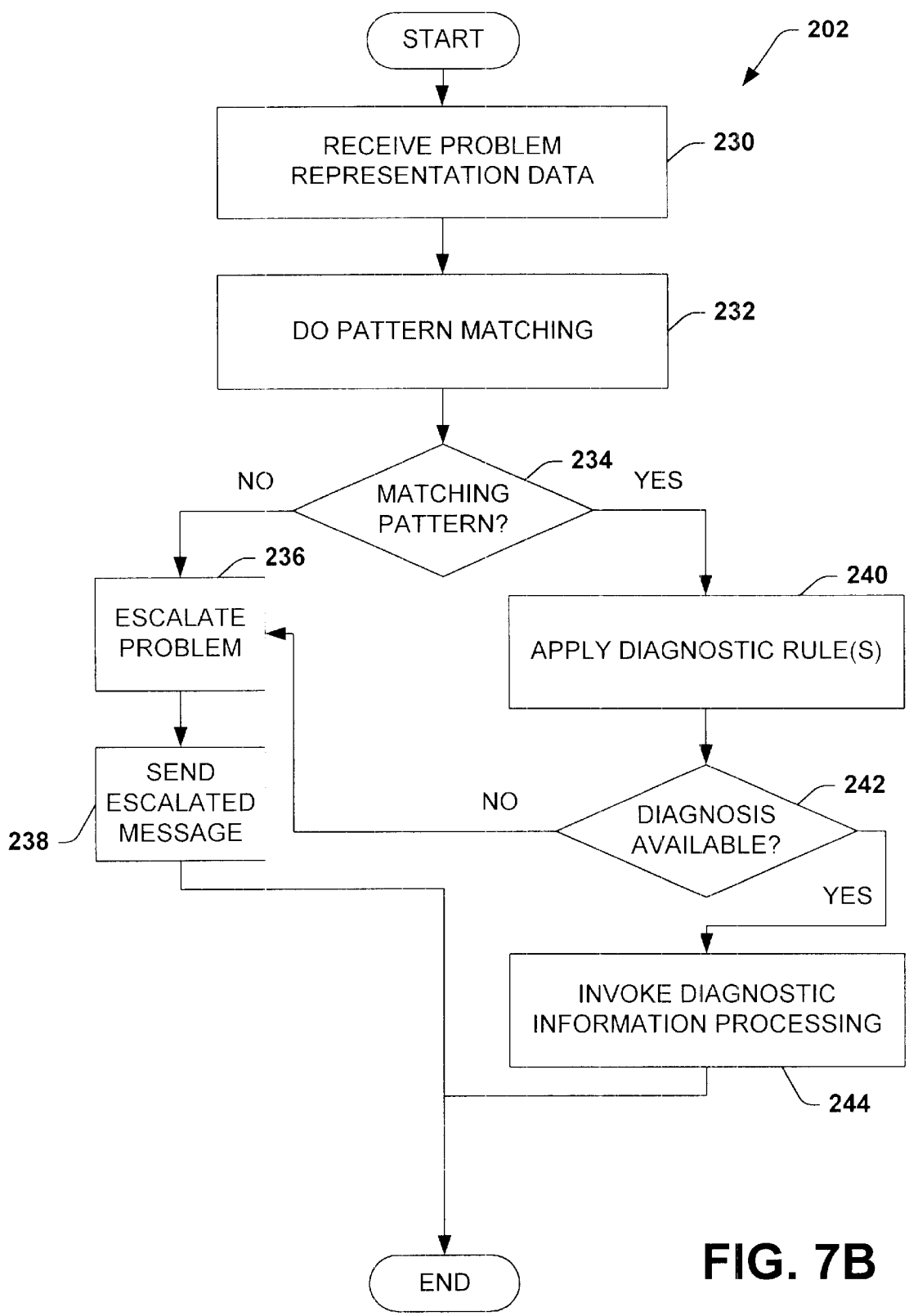
FIG. 7B is a flow chart further illustrating a methodology for processing problem representation data in accordance with an aspect of the present invention.

Turning now to FIG. 7B, step 202 of FIG. 6 is broken down into sub steps. At step 230, the problem representation data transmitted at step 220 of FIG. 7A is received. For example, a local copy of the problem representation data may be stored in memory or on disk. At step 232 the problem representation data is compared to stored patterns of known problems. By way of illustration, XSL pattern matching may be utilized to examine problem representation data stored in an XML document. At step 234 a determination is made concerning whether a matching pattern was found. If no matching pattern was found, then at step 236 the problem may be escalated to another entity, application or diagnoser for further processing. At step 238 a message may be sent to the object with the problem, which message includes information concerning the escalation of the problem.

If at step 234 the determination was made that a matching pattern was found, then at step 240 one or more diagnostic rules may be applied to the problem representation data and the matching pattern. By way of illustration, an XSL trigger may be invoked to apply the one or more diagnostic rules. The diagnostic rules may, for example, examine the pattern or patterns that have been matched to determine whether a diagnosis is available for the problem represented in the problem representation data. At step 242, a determination is made concerning whether a diagnosis is available. If no diagnosis is available, then at step 236 the problem may be escalated to another entity, application or diagnoser for further processing and at step 238 a message may be sent to the object with the problem, which message includes information concerning the escalation of the problem. If at step 242 it was determined that a diagnosis is available, then at step 244 the process illustrated in FIG. 7C may be invoked.

Figure 7C:
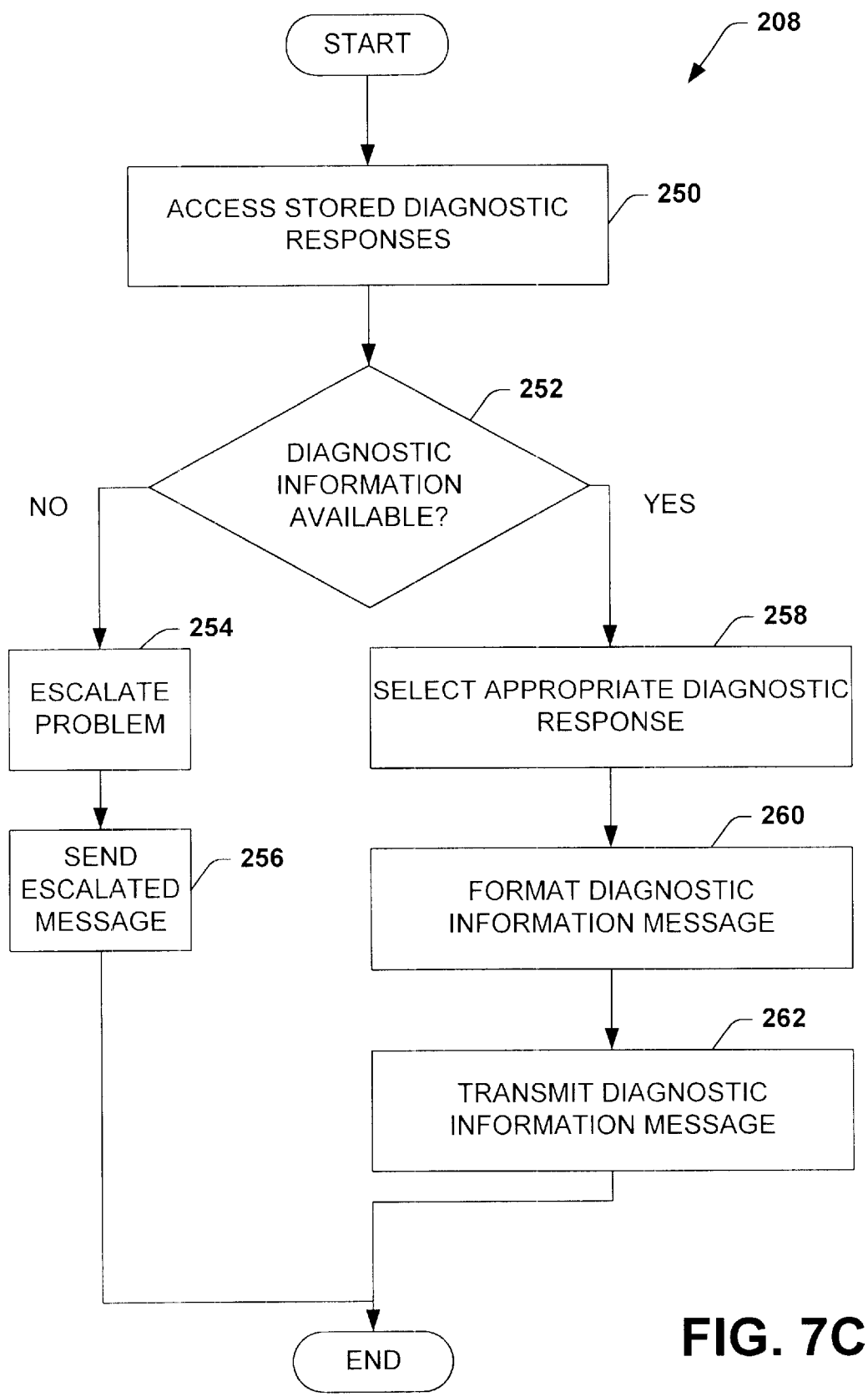
FIG. 7C is a flow chart further illustrating a methodology for producing diagnostic information in accordance with an aspect of the present invention.

Turning now to FIG. 7C, step 208 of FIG. 6 is broken down into sub steps. At step 250 the processing, invoked at step 244 of FIG. 7B is commenced. At step 250 a store of diagnostic responses are accessed. For example, using the results of the diagnostic rules as applied at step 240 of FIG. 7B, an index may be generated for accessing a table of diagnostic responses. At step 252, a determination is made concerning whether diagnostic information is available for the diagnosis identified at step 242. If no diagnostic information is available, then at step 254 the problem may be escalated to another entity, application or diagnoser for further processing and at step 256 a message may be sent to the object with the problem, which message includes information concerning the escalation of the problem. If it was determined at step 252 that diagnostic information was available, then at step 258 an appropriate diagnostic response is selected from the stored diagnostic responses. For example, the diagnosis selected at step 242 may indicate that diagnostic messages 1, 3 and 423 from the store of diagnostic messages are appropriate for replying to the identified problem. At step 260 a diagnostic information message may be formatted in preparation for transmittal to the object with the problem. By way of illustration, depending on the diagnostic information to be transmitted, an email message may be formatted, or a configuration file may be generated, and/or an XML document may be created. At step 262, the diagnostic information message formatted at step 260 is transmitted to the object with the problem.

Figure 7D:
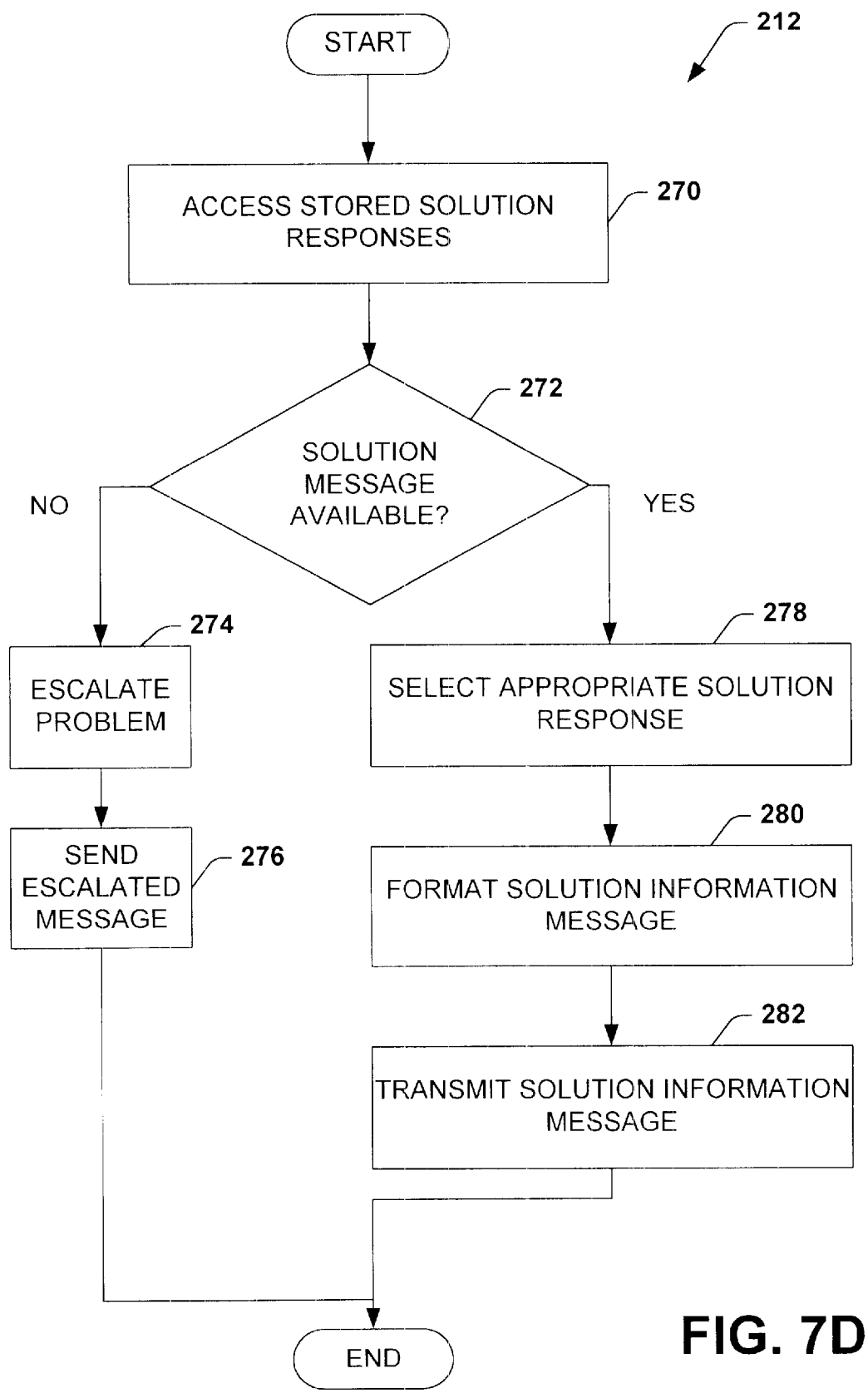
FIG. 7D is a flow chart further illustrating a methodology for producing solution information in accordance with an aspect of the present invention.

Turning now to FIG. 7D, step 212 of FIG. 6 is broken down into sub steps. For the solution identified at step 210 (FIG. 6), a store of solution responses is accessed. For example, the solution identified at step 210 may be utilized to generate an index into a table of stored solution responses. At step 272, a determination is made concerning whether a solution message is available for the identified solution. If no solution message is available, then at step 274 the problem may be escalated to another entity, application or diagnoser for further processing and at step 276 a message may be sent to the object with the problem, which message includes information concerning the escalation of the problem. If it was determined at step 272 that a solution message was available, then at step 278 the appropriate solution response will be selected from the store of solution responses. For example, the solution identified at step 210 may indicate that solution messages 12, 98 and 235 are appropriate for implementing a desired solution. At step 280 the solution message may be formatted. By way of illustration, an executable process may be formatted or a configuration file may be formatted, in preparation for transmittal to the object with the problem. At step 282, the solution information message formatted at step 280 may be transmitted to the object with the problem.

Figure 7E:
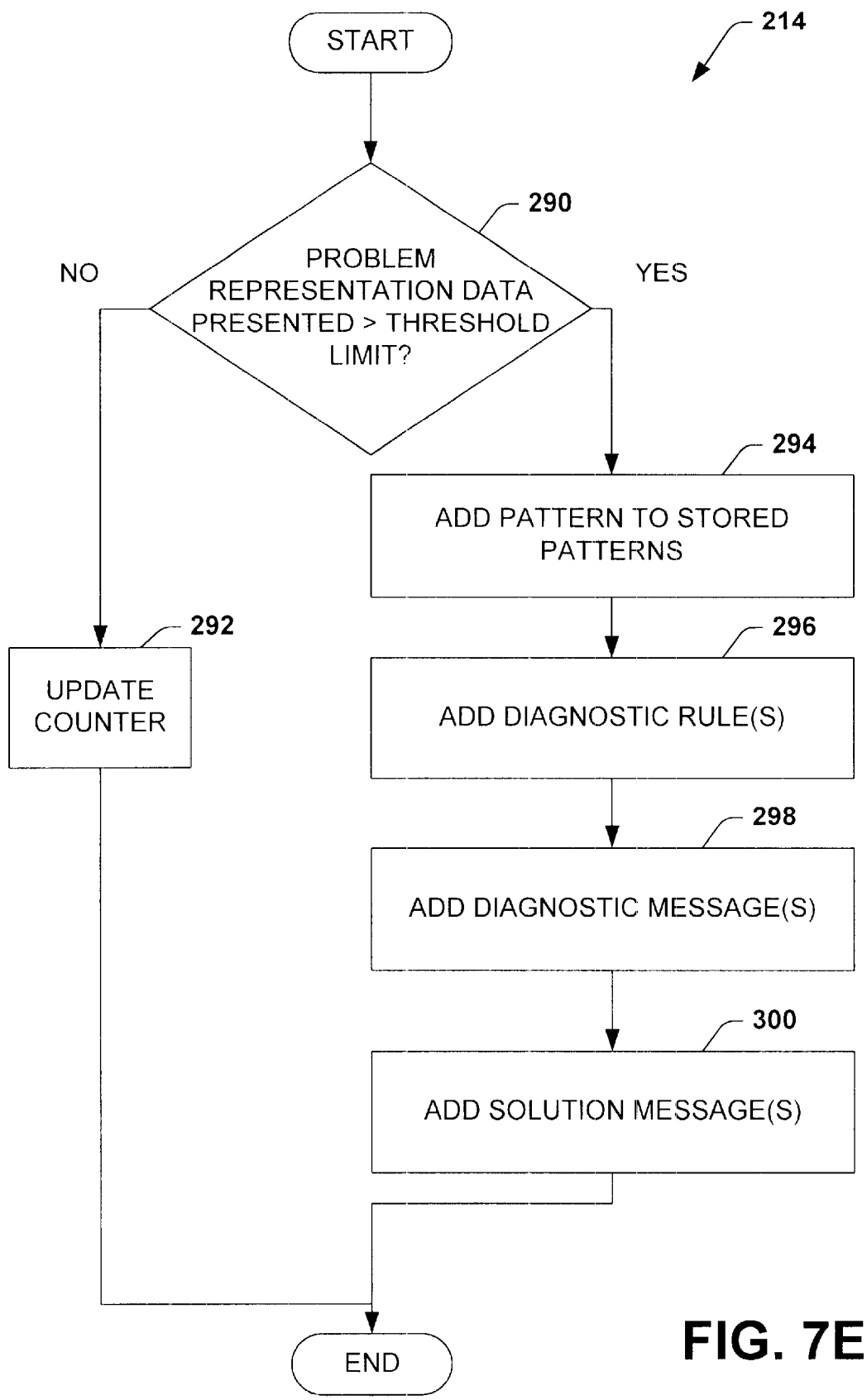
FIG. 7E is a flow chart further illustrating a methodology for selectively updating the processes illustrated in FIGS. 7B, 7C and 7D in accordance with an aspect of the present invention.

Turning now to FIG. 7E, step 214 of FIG. 6 is broken down into sub steps. At step 290 a determination is made whether problem representation data similar to the problem representation data received at step 230 (FIG. 7B) has been received more than a threshold number of times. For example, the determination made at step 290 may be whether the problem representation data been received more than one hundred times in the previous week. If at step 290 it is determined that the problem representation data has not been received more than the threshold number of times, then at step 292 a counter of how many times that problem representation data has been presented may be updated. If at step 290 it is determined that the problem representation data has been received more than the threshold number of times, then at step 294 the pattern or patterns found in the problem representation data may be inserted into the store of patterns to enable future pattern matching to match the inserted patterns. In this way the process is self-adapting which improves diagnosis. At step 296, one or more diagnostic rules may be generated and associated with the pattern or patterns stored at step 294 so that when the inserted patterns are matched, a desired diagnostic rule may be applied. Similarly, at step 298 one or more diagnostic messages may be generated and associated with the pattern or patterns stored at step 294 and at step 300 one or more solution messages may be generated and associated with the pattern or patterns stored at step 294 so that when an inserted pattern is matched and the inserted diagnostic rule is applied there may be diagnostic and solution information available to transmit back to the computer with the problem 20.

The processing illustrated in FIG. 7E facilitates updating the store of known patterns, the store of diagnostic responses and the store of solution responses so that the system can be self-adapting, thus improving diagnosis.

Figure 8:
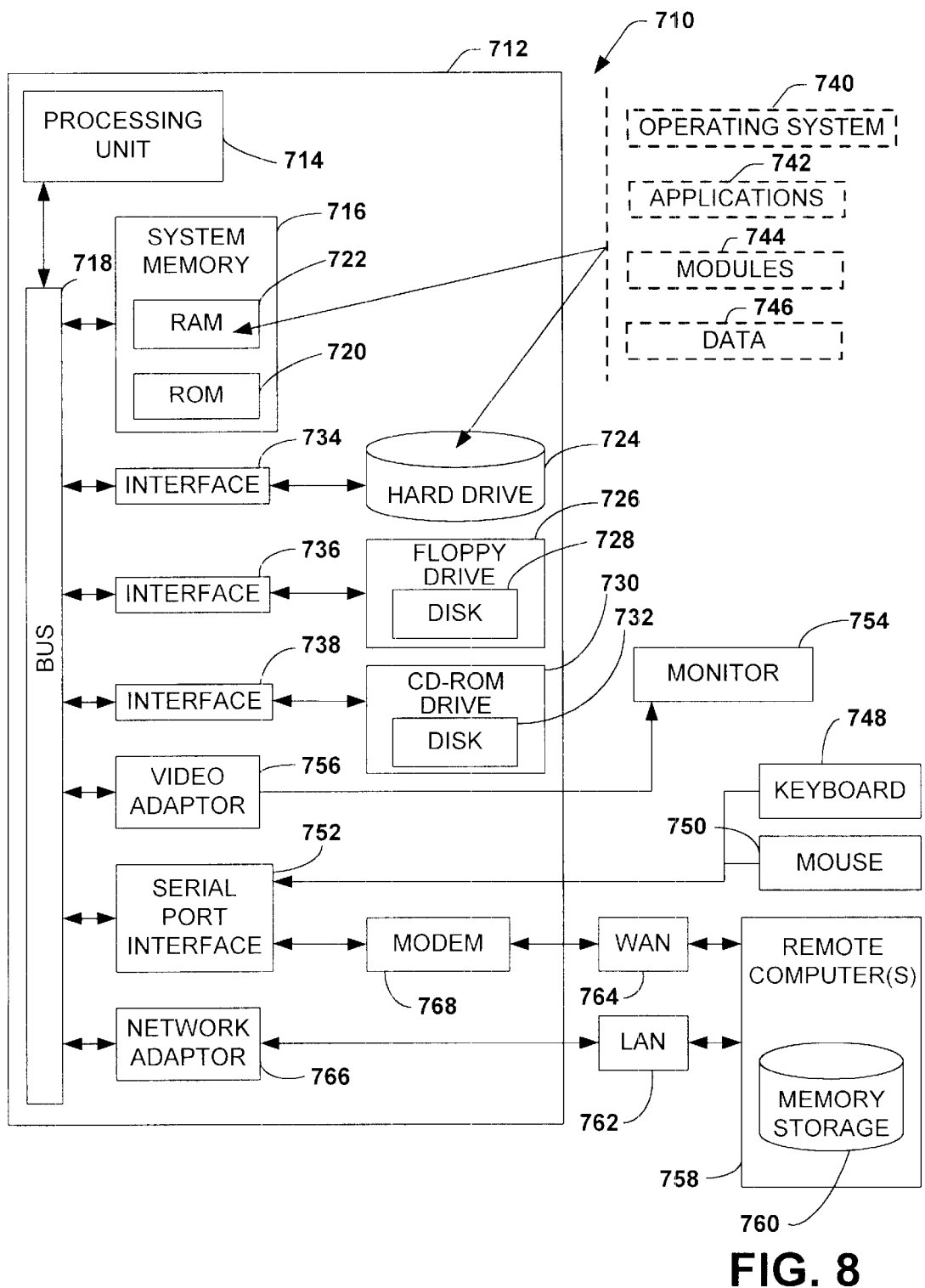
FIG. 8. is a block diagram of an exemplary operating environment for a system configured in accordance with the present invention.

In order to provide additional context for various aspects of the present invention, FIG. 8 and the following discussion are intended to provide a brief, general description of a suitable computing environment 710 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc.

that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference to FIG. 8, an exemplary environment 710 for implementing various aspects of the invention includes a computer 712, including a processing unit 714, a system memory 716, and a system bus 718 that couples various system components including the system memory to the processing unit 714. The processing unit 714 may be any of various commercially available processors, including but not limited to Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multiprocessor architectures also can be used as the processing unit 714.

The system bus 718 may be any of several types of bus structure including a memory bus or memory controller, a peripheral bus, and a local bus using any of a variety of conventional bus architectures such as PCI, VESA, Microchannel, ISA, and EISA, to name a few. The computer 712 memory includes read only memory (ROM) 720 and random access memory (RAM) 722. A basic input/output system (BIOS), containing the basic routines that help to transfer information between elements within the computer 712, such as during start-up, is stored in ROM 720.

The computer 712 further includes a hard disk drive 724, a magnetic disk drive 726, e.g., to read from or write to a removable disk 728, and an optical disk drive 730, e.g., for reading a CD-ROM disk 732 or to read from or write to other optical media. The hard disk drive 724, magnetic disk drive 726, and optical disk drive 730 are connected to the system bus 718 by a hard disk drive interface 734, a magnetic disk drive interface 736, and an optical drive interface 738, respectively. The drives and their associated computer-readable media provide nonvolatile storage of data, data structures, computer-executable instructions, etc. for the computer 712, including for the storage of broadcast programming in a suitable digital format. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 722, including an operating system 740, one or more application programs 742, other program modules 744, and program data 746. The operating system 740 in the illustrated computer is, for example, the "Microsoft Windows NT" operating system, although it is to be appreciated that the present invention may be implemented with other operating systems or combinations of operating systems, such as UNIX, LINUX, etc.

A user may enter commands and information into the computer 712 through a keyboard 748 and a pointing device, such as a mouse 750. Other input devices (not shown) may include a microphone, an IR remote control, a joystick, a game pad, a satellite dish, a scanner, or the like. These and other input devices are often connected to the processing unit 714 through a serial port interface 752 that is coupled to the system bus 718, but may be connected by other interfaces, such as a parallel port, a game port, a universal serial bus ("USB"), an IR interface, etc. A monitor 754 or other type of display device is also connected to the system bus 718 via an interface, such as a video adapter 756. In addition to the monitor, a computer typically includes other peripheral output devices (not shown), such as speakers, printers etc.

The computer 712 may operate in a networked environment using logical connections to one or more remote computers, such as a remote computer(s) 758. The remote computer(s) 758 may be a workstation, a server computer, a router, a personal computer, microprocessor based entertainment appliance (e.g., a WebTV client system), a peer device or other common network node, and typically includes many or all of the elements described relative to the computer 712, although, for purposes of brevity, only a memory storage device 760 is illustrated in FIG. 8. The logical connections depicted in FIG. 8 include a local area network (LAN) 762 and a wide area network (WAN) 764. Such networking environments are commonplace in offices, enterprise-wide computer networks, intranets and the Internet.

When used in a LAN networking environment, the computer 712 is connected to the local network 762 through a network interface or adapter 766. When used in a WAN networking environment, the computer 712 typically includes a modem 768, or is connected to a communications server on the LAN, or has other means for establishing communications over the WAN 764, such as the Internet. The computer 712 may also be utilized in a wireless environment, (e.g hand-held devices like cellular telephones and personal digital assistants (PDA). The modem 768, which may be internal or external, is connected to the system bus 718 via the serial port interface 752. In a networked environment, program modules depicted relative to the computer 712, or portions thereof, may be stored in the remote memory storage device 760. It will be appreciated that the network connections shown are exemplary and other means of establishing a communications link between the computers may be used.

In accordance with the practices of persons skilled in the art of computer programming, the present invention has been described with reference to acts and symbolic representations of operations that are performed by a computer, such as the computer 712 or remote computer(s) 758, unless otherwise indicated. Such acts and operations are sometimes referred to as being computer-executed. It will be appreciated that the acts and symbolically represented operations include the manipulation by the processing unit 714 of electrical signals representing data bits which causes a resulting transformation or reduction of the electrical signal representation, and the maintenance of data bits at memory locations in the memory system (including the system memory 716, hard drive 724, floppy disks 728, CD-ROM 732) to thereby reconfigure or otherwise alter the computer system's operation, as well as other processing of signals. The memory locations where such data bits are maintained are physical locations that have particular electrical, magnetic, or optical properties corresponding to the data bits.

What has been described above includes examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising."

What is claimed is:

1. An application for diagnosing problems with an object comprising:
   a component for generating problem representation data;
   a component for applying at least one diagnostic rule to the problem representation data;
   a component for storing a user interface schema that facilitates generating problem representation data;
   a component for storing a diagnosis and solution database to provide diagnostic and solution information; and
   a component for generating and transmitting at least one of diagnostic information and solution information relating to the problem representation data.

2. The application of claim 1 further comprising a component for updating the diagnosis and solution database.

3. The application of claim 1 wherein the problem representation data conforms to a problem representation schema.

4. The application of claim 3 wherein the object is a computer.

5. The application of claim 3 wherein the object is a device.

6. The application of claim 3 wherein the object is a system.

7. The application of claim 3 wherein the object is another application.

8. The application of claim 4 wherein the application is associated with the computer to be diagnosed.

9. The application of claim 4 wherein the application is associated with a server computer separate from the computer to be diagnosed.

10. The application of claim 8 wherein the application may be updated by at least one server computer.

11. A method for diagnosing an object with a problem comprising the steps of:
    storing a user interface schema to facilitate generating problem representation data;
    generating problem representation data;
    automatically processing the problem representation data to facilitate generating at least one of diagnostic and solution information;
    accessing a store of diagnostic and solution information; and
    automatically generating and transmitting at least one of diagnostic information and solution information to the object with the problem.

12. The method of claim 11 further comprising the step of updating the store of diagnostic and solution information.

13. The method of claim 12 wherein the problem representation data is stored in an XML document.

14. The method of claim 12 wherein the step of generating the problem representation data further comprises the steps of:
    identifying one or more user interface structures associated with the problem representation data;
    identifying one or more dialogs traversed in the user interface structures;
    identifying one or more values associated with the dialogs traversed in the user interface structures;
    formatting the problem representation data; and
    transmitting the problem representation data.

15. The method of claim 14 wherein the step of automatically processing the problem representation data further comprises the steps of:
    receiving the problem representation data;
    pattern matching the problem representation data against a store of known patterns;
    selectively escalating the problem;
    applying one or more diagnostic rules to the problem representation data; and
    selectively invoking diagnostic information processing.

16. The method of claim 15 wherein the step of generating and sending at least one of diagnostic information and solution information further comprises the steps of:
    accessing a store of diagnostic responses;
    selecting an appropriate diagnostic response;
    formatting the diagnostic information message;
    transmitting the diagnostic information message;
    accessing a store of solution responses;
    selecting an appropriate solution information message;
    formatting the solution information message;
    transmitting the solution information message; and
    selectively escalating the problem to a separate diagnostic entity.

17. The method of claim 15 wherein the pattern matching is XLS pattern matching.

18. The method of claim 11 wherein the diagnostic information is transmitted via email.

19. The method of claim 11 wherein the diagnostic information is transmitted via an XML document.

20. The method of claim 11 wherein the diagnostic information is a configuration file.

21. The method of claim 11 wherein the solution information is a process for reconfiguring the object with the problem.

22. The method of claim 11 wherein the solution information is transmitted via email.

23. The method of claim 11 wherein the solution information is transmitted via an XML document.

24. The method of claim 11 wherein the solution information is transmitted via a configuration file.

25. The method of claim 11 wherein the solution information is verifiably trustworthy and automatically applied by the receiving device.

26. An application for diagnosing problems with an object comprising:
    means for storing a user interface schema to facilitate generating problem representation data;
    means for generating problem representation data;
    means for processing the problem representation data;
    means for applying at least one diagnostic rule to the problem representation data; and
    means for generating at least one of diagnostic information and solution information relating to the problem resolution data.

27. The application of claim 26 further comprising means for updating a store of diagnostic and solution information.

28. The application of claim 26 wherein the problem representation data conforms to a problem representation schema.

29. The application of claim 26 wherein the object is a computer.

30. The application of claim 26 wherein the object is a device.

31. The application of claim 26 wherein the object is a system.

32. The application of claim 26 wherein the object is another application.

33. The application of claim 26 wherein the application is associated with the computer to be diagnosed.

34. The application of claim 26 wherein the application is associated with a server computer separate from the computer to be diagnosed.

35. The application of claim 26 wherein the application may be updated by at least one server computer.

36. An system that diagnoses problems with an object comprising:

a component that generates problem representation data;

a component that applies at least one diagnostic rule to the problem representation data;

a component that stores a user interface schema that facilitates generating problem representation data;

a component that stores a diagnosis and solution database to provide diagnostic and solution information; and a component that generates and transmits at least one of diagnostic information and solution information relating to the problem representation data.

37. The system of claim 36 further comprising a component that updates the diagnosis and solution database.

38. The system of claim 36 wherein the problem representation data conforms to a problem representation schema.

39. The system of claim 38 wherein the object is a computer.

40. The system of claim 38 wherein the object is a device.

41. The system of claim 38 wherein the object is another system.

42. The system of claim 38 wherein the object is an application.

43. The system of claim 39 wherein the system is associated with the computer to be diagnosed.

44. The system of claim 39 wherein the system is associated with a server computer separate from the computer to be diagnosed.

45. The system of claim 43 wherein the system may be updated by at least one server computer.

* * * * *